N. W. WHEELER.
Harrow and Cultivator.
No. 82,775.
Patented Oct. 6, 1868.
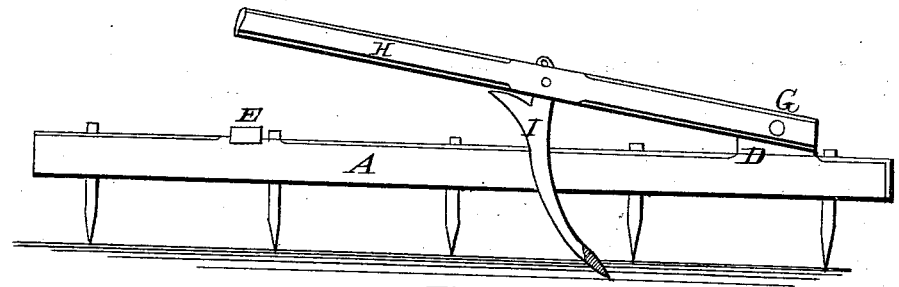
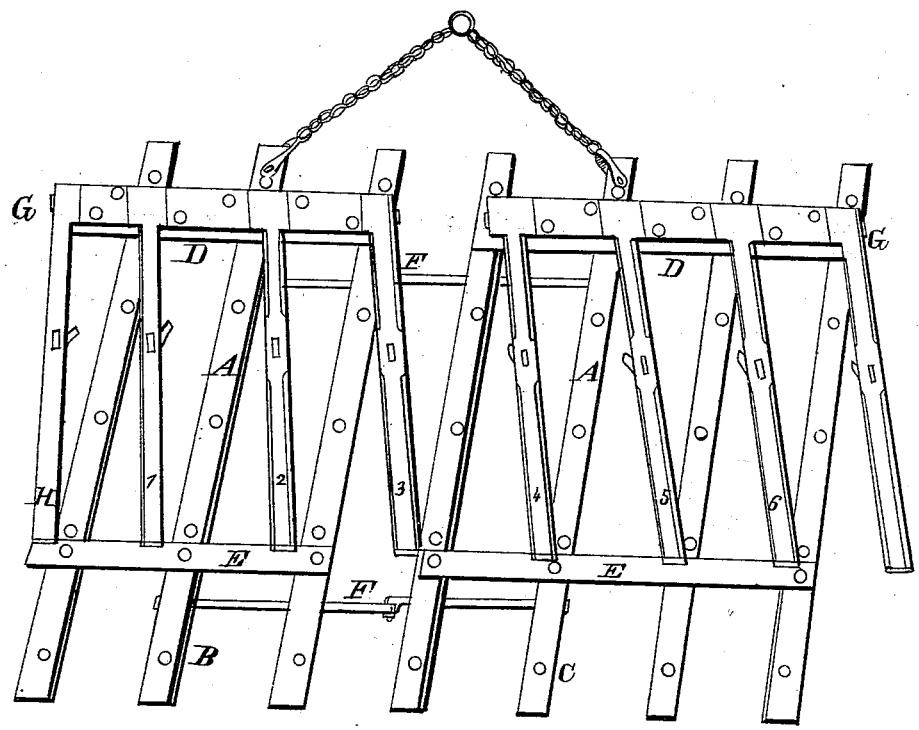

United States Patent Office.

N. W. WHEELER, OF RIPON, WISCONSIN.

Letters Patent No. 82,775, dated October 6, 1868.

---

IMPROVEMENT IN COMBINED HARROW AND CULTIVATOR.

---

The Schedule referred to in these Letters Patent and making part of the same.

---

TO ALL WHOM IT MAY CONCERN:

Be it known that I, N. W. WHEELER, of Ripon, in the county of Fond du Lac, in the State of Wisconsin, have invented a new and improved Combined Harrow and Cultivator; and I do hereby declare that the following is a full and exact description thereof, reference being had to the accompanying drawings, and to the letters and figures of reference marked thereon.

The nature of my invention consists in providing a harrow as usually constructed in the well-known "square-harrow" form, and in attaching on the upper part of the forward cross-bar or brace, a series of drag-bars, arranged obliquely, and held in place with removable iron rods. In each of these drag-bars, just forward of their centres transversely, is secured the iron bar to which, at its lower end, is fastened the cultivator-tooth, all of them being so arranged that they have a downward draught, and placed equal distances apart, and, with the exception of the two outside ones, occupy a position about midway between the bars containing the teeth of the harrow. The cultivator-teeth are easily adjusted by simply changing the bolt or pin holding the cultivator-bar from one hole to another.

The drag-bars being pivoted at their forward ends, they have an upward and downward movement, thereby allowing the cultivator-teeth to adapt themselves to any inequality of surface, and it has been practically demonstrated that this combination of a harrow and cultivator will more effectually accomplish the purpose of thoroughly pulverizing the soil in once passing over it, than in the use of an ordinary harrow alone, by passing over three different times.

When the harrow alone is required for use, the iron rod holding the drag-bars in place may be withdrawn, and the cultivating-device is at once detached from the harrow.

To enable others skilled in the art to make and use my invention, I will proceed to describe its construction.

The harrow, represented in the drawings at A, is constructed in about the ordinary form and size of the well-known double "square harrow," with three bars for teeth in the left-hand part, marked B, and four bars for teeth in the right-hand part, marked C, each of these parts being substantially braced with cross-bars, as at D and E, and the two sections fastened together with bolt-hinges, or the ordinary "hook-and-eye" hinges, as commonly used, and marked F F.

On the top of the forward cross-bar, marked D, of the harrow, are fastened the rods G G, which pass through the front lower ends of and hold in place the drag-bars H, 1, 2, 3, 4, 5, 6, 7, which are elevated at the rear ends, as ordinarily working, or if the cultivator-teeth pass down into holes or depressions in the soil, the drag-bars will strike upon the rear cross-bar E of the harrow. The cultivator-bar and tooth, marked I, are constructed in about the form commonly used, and are made easily adjustable by punching two or more holes through the upper part of the cultivator-bar.

The chain to which the whiffle-trees are attached is fastened at the ends of a bar in each section of the harrow, with clevises or suitable hooks.

What I claim, is—

The combination, and mode of attachment, of a harrow and cultivator, substantially as described, and for the purposes specified.

N. W. WHEELER.

Witnesses:
E. L. RUNALS,
A. WOLFF.